United States Patent
Naghian et al.

(10) Patent No.: US 7,209,757 B2
(45) Date of Patent: Apr. 24, 2007

(54) LOCATION INFORMATION SERVICES

(75) Inventors: Siamäk Naghian, Espoo (FI); Otto-Aleksanteri Lehtinen, Raisio (FI)

(73) Assignee: Nokia Corporation, Espoo (FI)

(*) Notice: Subject to any disclaimer, the term of this patent is extended or adjusted under 35 U.S.C. 154(b) by 243 days.

(21) Appl. No.: 10/276,754

(22) PCT Filed: Apr. 23, 2001

(86) PCT No.: PCT/EP01/04570

§ 371 (c)(1),
(2), (4) Date: Apr. 9, 2003

(87) PCT Pub. No.: WO01/91485

PCT Pub. Date: Nov. 29, 2001

(65) Prior Publication Data

US 2003/0153330 A1 Aug. 14, 2003

(30) Foreign Application Priority Data

May 19, 2000 (GB) ................................ 0012195.4

(51) Int. Cl.
*H04Q 7/20* (2006.01)

(52) U.S. Cl. .............................. 455/456.3; 455/414.1; 340/539.18; 342/357.17

(58) Field of Classification Search .. 455/456.1–456.6, 455/414.1, 457, 458, 517, 445; 340/994, 340/539.1, 539.13, 539.18; 705/5, 6, 26; 701/208, 211, 209, 216, 201; 342/357.1, 342/357.08, 357.09, 357.17

See application file for complete search history.

(56) References Cited

U.S. PATENT DOCUMENTS

| | | | | |
|---|---|---|---|---|
| 4,737,977 A | * | 4/1988 | Norman | ...................... 455/403 |
| 5,168,451 A | * | 12/1992 | Bolger | ........................ 701/117 |
| 5,493,694 A | * | 2/1996 | Vlcek et al. | ................. 455/521 |
| 5,570,100 A | | 10/1996 | Grube et al. | |
| 5,648,768 A | * | 7/1997 | Bouve | ......................... 340/988 |
| 5,722,083 A | * | 2/1998 | Konig | ......................... 455/517 |
| 5,724,520 A | * | 3/1998 | Goheen | ......................... 705/5 |
| 5,799,263 A | * | 8/1998 | Culbertson | ................... 701/117 |
| 5,812,959 A | * | 9/1998 | Froeburg et al. | ............ 701/117 |
| 5,959,577 A | * | 9/1999 | Fan et al. | ............... 342/357.13 |
| 5,963,861 A | * | 10/1999 | Hanson | .................... 455/456.1 |

(Continued)

FOREIGN PATENT DOCUMENTS

| | | |
|---|---|---|
| EP | 0 849 964 A1 | 6/1998 |
| EP | 0 889 455 A1 | 1/1999 |
| FR | 2 674 355 | 9/1992 |
| WO | WO 00/17737 | 3/2000 |

*Primary Examiner*—Charles N. Appiah
(74) *Attorney, Agent, or Firm*—Squire, Sanders & Dempsey, LLP.

(57) ABSTRACT

The present invention relates to a system and method for providing services for mobile users based on location information. A plurality of devices is defined to form a group of devices. A first location information is determined, said first information associating with the location of at least one of the devices in the group. Second location information is also determined, said second information associating with the location of a station of the mobile user. The first and second information is processed to generate third information, said third information being based on the location of the station relative to the location of at least one device of the group. Third information is transported in a communication system after the transportation is triggered by a predefined condition.

52 Claims, 5 Drawing Sheets

U.S. PATENT DOCUMENTS

| | | | |
|---|---|---|---|
| 6,006,159 A * | 12/1999 | Schmier et al. | 701/200 |
| 6,212,393 B1 * | 4/2001 | Suarez et al. | 455/456.4 |
| 6,304,850 B1 * | 10/2001 | Keller et al. | 705/5 |
| 6,339,745 B1 * | 1/2002 | Novik | 701/208 |
| 6,466,796 B1 * | 10/2002 | Jacobson et al. | 455/456.3 |
| 6,519,463 B2 * | 2/2003 | Tendler | 455/456.3 |
| 6,529,735 B1 * | 3/2003 | De Brito | 455/456.1 |
| 6,535,743 B1 * | 3/2003 | Kennedy et al. | 455/456.1 |
| 6,563,430 B1 | 5/2003 | Kemink et al. | |
| 6,606,557 B2 * | 8/2003 | Kotzin | 701/209 |
| 6,615,046 B1 * | 9/2003 | Ur | 455/445 |
| 6,711,500 B2 * | 3/2004 | Chen | 701/213 |
| 6,756,913 B1 * | 6/2004 | Ayed | 340/825.49 |
| 2002/0016171 A1 * | 2/2002 | Doganata et al. | 455/456 |
| 2003/0065556 A1 * | 4/2003 | Takanashi et al. | 705/13 |

* cited by examiner

LOCATION INFORMATION SERVICES

FIELD OF THE INVENTION

The present invention relates to services that are based on location information associated with of a mobile user equipment.

BACKGROUND OF THE INVENTION

A mobile user equipment and thus the user thereof can be positioned by various different techniques. For example, substantially accurate geographical location information that associates with a user equipment can be obtained based on the known satellite based GPS (Global Positioning System). More accurate location information can be obtained through a differential GPS. Another possibility is to use a location service that associates with a cellular telecommunications system for the provision of the location information.

In the latter the cells or similar geographically limited radio access entities and associated controllers of the communication system can be utilised to produce at least a rough location information estimate concerning the current location of the mobile user equipment or station, as the cellular telecommunications system is aware of the cell or service area with which the user equipment currently associates. The cellular system may be provided with location measurement units that provide more accurate data concerning the location of a mobile user equipment within the service area of the cellular system. It is also possible to conclude geographical location when the mobile user equipment is located within the coverage area of a visited or "foreign" network. The visited network may be made capable of transmitting the location of the mobile user equipment back to the home network, e.g. to support location services or for the purposes of routing and charging.

The location data that is provided by means of the elements of the cellular system may be processed in a specific location service node that is implemented either within the cellular system or connected thereto. The location data may also be processed in the user equipment that is provided with appropriate processing capacity. The location service facility provided by the communication system may serve different clients via an appropriate interface. The location information may be used for various purposes, such as for location of a mobile telephone that has made an emergency call, for locating vehicles or given mobile subscribers and so on.

However, the inventors have found that while the clients may receive information concerning the location of a mobile user, the mobile user himself may wish to receive services that utilise information provided by the location services and thus there is a need for new type of services that are based on location information.

SUMMARY OF THE INVENTION

It is an aim of the embodiments of the present invention to provide services that are based on information that associates with the location of the mobile user.

According to one aspect of the present invention, there is provided a method comprising: grouping a plurality of devices into a group; determining first location information that associates with the location of at least one of the devices of the group; determining second location information that associates with the location of a station; processing the first and second location information to generate third information, said third information being based on the location of the station relative to the location of at least one device of the group; and transporting the third information, the transportation being triggered by a predefined condition.

According to another aspect of the present invention there is provided a method for providing information that associates with means of transportation that are available for a user of a station, comprising the steps of: determining first information that relates to the location of at least one means of transportation; determining second information that relates to the location of the station; processing the first information and the second information to obtain third information, said third information that associates with at least one means of transportation that is possible for the user; and presenting the third information to the user by the station.

According to another aspect of the present invention there is provided a system comprising: a station of a communication system; a plurality of devices, the devices being adapted to provide at least one service for a user of the station; means for grouping the plurality of devices into at least one group; means for determining first location information, the first information associating with the location of at least one of the devices; means for determining second location information, the second information associating with the location of the station; processor means for processing the first location information and second location information for generating third information, said third information being based on relative locations of the station and the at least one device; and an interface via which the third information is transported after the transportation is triggered by a predefined event.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
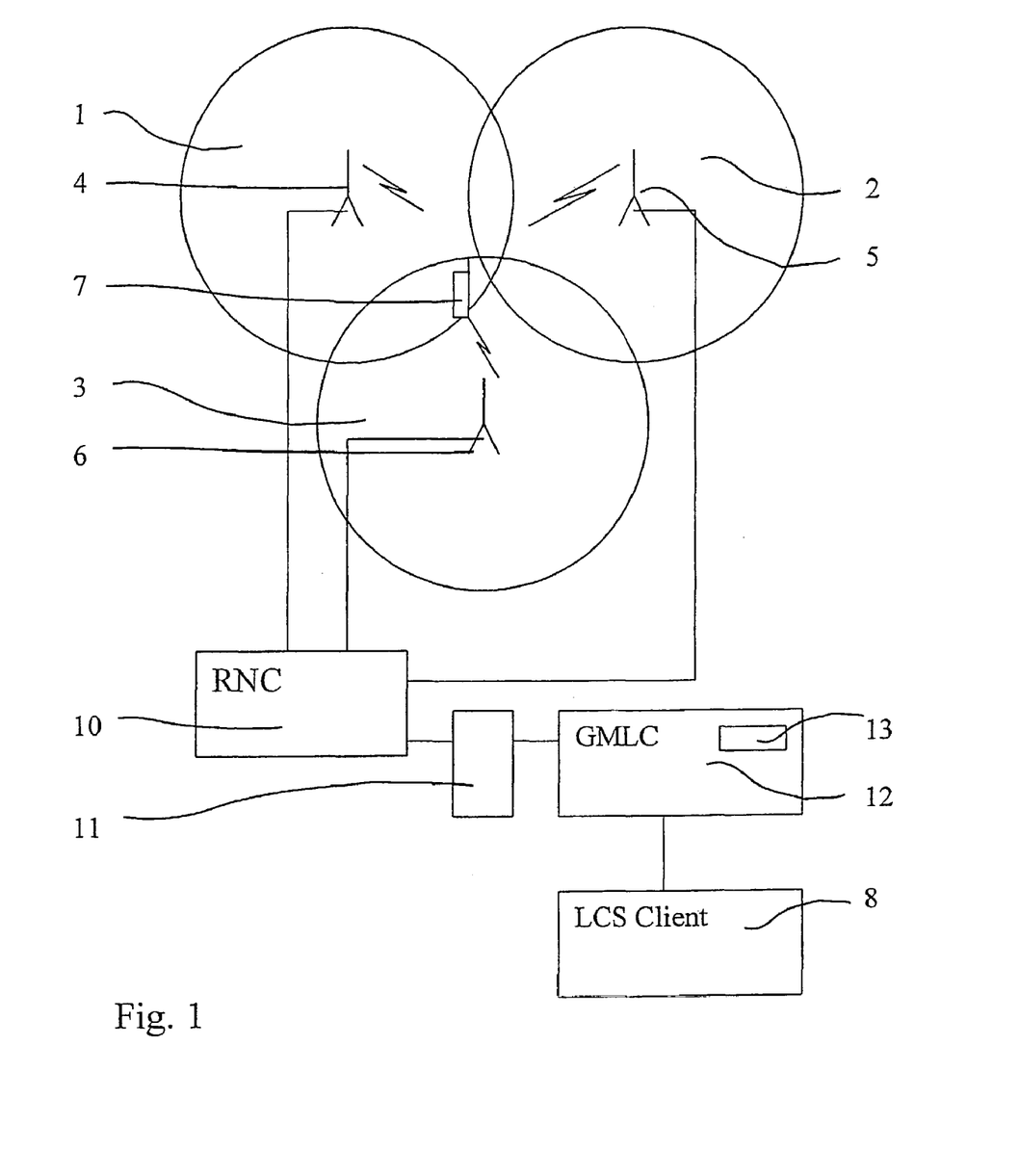
FIG. 1 shows a cellular system in which the embodiments of the present invention may be implemented.

Before explaining the preferred embodiment of the invention in more detail, a reference is made to FIG. 1 which is a simplified presentation of a cellular system providing location services. It should be appreciated that even though the exemplifying telecommunications network shown and described in more detail uses the terminology of the WCDMA (Wideband Code Division Multiple Access) UMTS (Universal Mobile Telecommunications System) public land mobile network (PLMN), the proposed solution can be used in any system providing communications between a mobile station and a base station and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000) and so on.

More particularly, FIG. 1 shows an arrangement in which three base stations of the cellular system provide omnidirectional radio coverage areas 1, 2 and 3 of a cellular telecommunications network. It should be appreciated that one cell may include more than one base station site. A base station apparatus or site may also provide more than one cell. The shape of the cells depends on the implementation and may be different from the illustrated omnidirectional shape. The shape and size of the cells may also vary from cell to cell.

In FIG. 1 each radio coverage area 1, 2 and 3 is served by the respective base station 4, 5 and 6. It should be appreciated that in some systems, such as in the systems providing $3^{rd}$ generation telecommunication services, the base station may be referred to as Node B. For clarity reasons this specification will use the term base stations for all kinds of stations that are capable of transmitting signals towards and/or receiving signals from a user equipment. More particularly, each base station 4 to 6 is arranged to transmit signals to and receive signals from the mobile user equipment (UE) 7 via wireless communication. Likewise, the user equipment 7 is able to transmit signals to and receive signals from the respective base station. The user equipment is also often referred to as mobile station (MS). Typically a number of mobile stations will be in communication with each base station although only one mobile station 7 is shown in FIG. 1 for clarity.

Each of the base stations 4 to 6 is connected to a network controller 10, which in the exemplifying PLMN system is a radio network controller (RNC) of a UMTS terrestrial radio access network (UTRAN). It is noted that typically more than one controller is provided in a cellular network. The radio network controller 10 may be connected to appropriate core network entities of the cellular system, such as a MSC (mobile switching centre) and/or SGSN (serving general packet radio service support node) 11, via a suitable interface arrangement.

The mobile station 7 is able to move from one cell coverage area to another cell coverage area. The location of the mobile station 7 may thus vary in time as the mobile station is free to move from one location (base station coverage area or cell coverage area) to another location (to another coverage area) and also within one coverage area.

FIG. 1 also shows a location services (LCS) node 12 providing location services for different applications or clients 8 (only one client shown for clarity). In general terms, the LCS node can be defined as an entity capable of providing information concerning the geographical location of a mobile station. The geographical location may be defined on the basis of the position of the mobile station relative to the base station(s) of the mobile telecommunications network.

The geographical location of the base station and/or the mobile stations may be defined, for example, in X and Y coordinates or in latitudes and longitudes. A possibility is to use the relation between defined radiuses and angles, e.g. based on the spherical coordinate system or alike. It is also possible to define the location of the base stations and/or mobile stations in vertical directions. For example, Z coordinate may be used when providing the location information in the vertical direction. The vertical location may be needed e.g. in mountainous environments or in cities with tall buildings.

In FIG. 1 the node 12 is shown to comprise a gateway mobile location center (GMLC) that is provided in the core network side of the telecommunications system. The location service node 12 is arranged to receive via appropriate interface means predefined information concerning the location of the mobile station 7 from the cellular system. The location service node is adapted to process the information in order to determine the geographical location of the mobile station. The information received by the node 12 may include the identity (such as an international mobile subscriber identifier: IMSI) or a temporary identifier (such as a temporary international mobile subscriber identifier: TIMSI) of the mobile station 7. Information that associates with the identity of the cell, or the identity of the service area (containing one cell or several cells) that is serving the mobile station and/or mode precise location measurement data measured by means of one or several location measurement units (not shown) may also be provided. Node 12 processes this information and/or some other predefined parameters and/or computes by processor means 13 appropriate calculations for determining and outputting the geographical location of the given mobile station 7.

The location service node 12 may be implemented in the core network and is arranged to receive location information from the radio access network via MSC and/or SGSN 11 connected by the appropriate interface means to the access network. The positioning information is obtained using one or more of the appropriate techniques some of which will be briefly discussed below or any other suitable technique. This information may be processed in a predefined manner and is then provided to the LCS Client 8.

It should be appreciated that the elements of the location service functionality may be implemented anywhere in the telecommunications system. The location service implementation may also be distributed between several elements of the system. The LCS node may also be an external node to the cellular system. According to an embodiment the mobile station or user equipment provides the location service node. The mobile station is provided with the location service processing function and is capable of generating and transporting location information thereof to the clients. The mobile station may be provided with terminal equipment apparatus (either integrated in the mobile station device or connected thereto). The location information may be based on use of information provided by system that is separate from the communication system, such as by means of the Global Positioning System (GPS) or similar.

The LCS server node 12 may consists of a number of location service components and bearers needed to serve the LCS clients 8. The LCS server node 12 may provide a platform which will enable the support of location based services in parallel with other telecommunication services such as speech, data, messaging, other teleservices, user applications and supplementary services. The LCS server node 12 may respond to a location request from a properly authorised LCS client 8 with location information for the target mobile stations specified by the LCS client 8 if considerations of target mobile station privacy are satisfied. The LCS Server 12 may thus provide the client 8, on request or periodically, the current or most recent geographic location (if available) of the target mobile station or, if the location fails, an error indication and optionally the reason for the failure. A more detailed description of a LCS node that may be employed in the embodiments of can be found e.g. from ETSI (European telecommunications Standards Institute) technical specification "Location Services" (3GPP TS23.171 and GSM 03.71).

The LCS client 8 is a logical functional entity that may make a request to the entity providing the location service function, such as the LCS server node 12 or the mobile station equipment, for the location information of one or more target mobile stations. The LCS client 8 may be an entity that is external to the PLMN. The client 8 may also be an internal client (ILCS) i.e. reside in any entity or node (including the mobile station) within the PLMN. The LCS clients are entitled to receive at least some degree of information concerning the location (or location history) of the mobile station 7. The particular requirements and characteristics of a LCS Client 8 are typically known to the LCS server by its LCS client subscription profile. The particular LCS-related restrictions associated with each target mobile station may also be detailed in the target mobile station subscription profile. The location service feature may permit the location of a target mobile station to be determined at any time, as will be discussed later in this description.

The client 8 may comprise a service that provides information concerning a plurality of mobile entities, such as mobile stations or otherwise requires location information of one or more mobile stations for its operation. The location information that associates with a station may be classified and/or filtered based on the location of the station. According to an embodiment the subscribers are grouped into one or more "location service groups". The group may consist of subscribers that are of a predefined type, such as salesman, serviceman, delivery cars, means of transportation (such as taxis, busses, trains, aeroplanes) or any other group of mobile user equipment that may need to be located and may be grouped together based on an appropriate criteria.

The grouping may also be dynamic. For example, a list defining a group may be dynamically changed based on information of the movements of the mobile stations. The lists defining the groups may be hierarchically arranged. The linking between the lists may vary depending on predefined rules, e.g. based on movements of the listed mobile stations and/or time.

A more specific example of the grouping will be discussed later with reference to FIGS. 4 and 5, where the group is formed by means of transportation, such as busses and/or trains.

Figure 2:
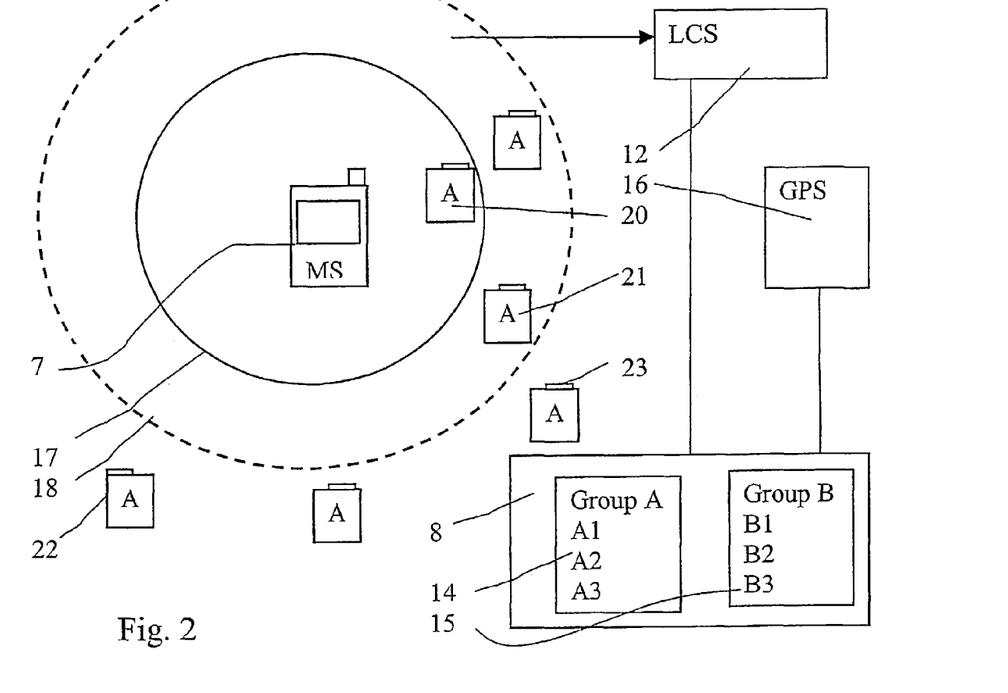
FIG. 2 shows an embodiment of the present invention.
Figure 3:
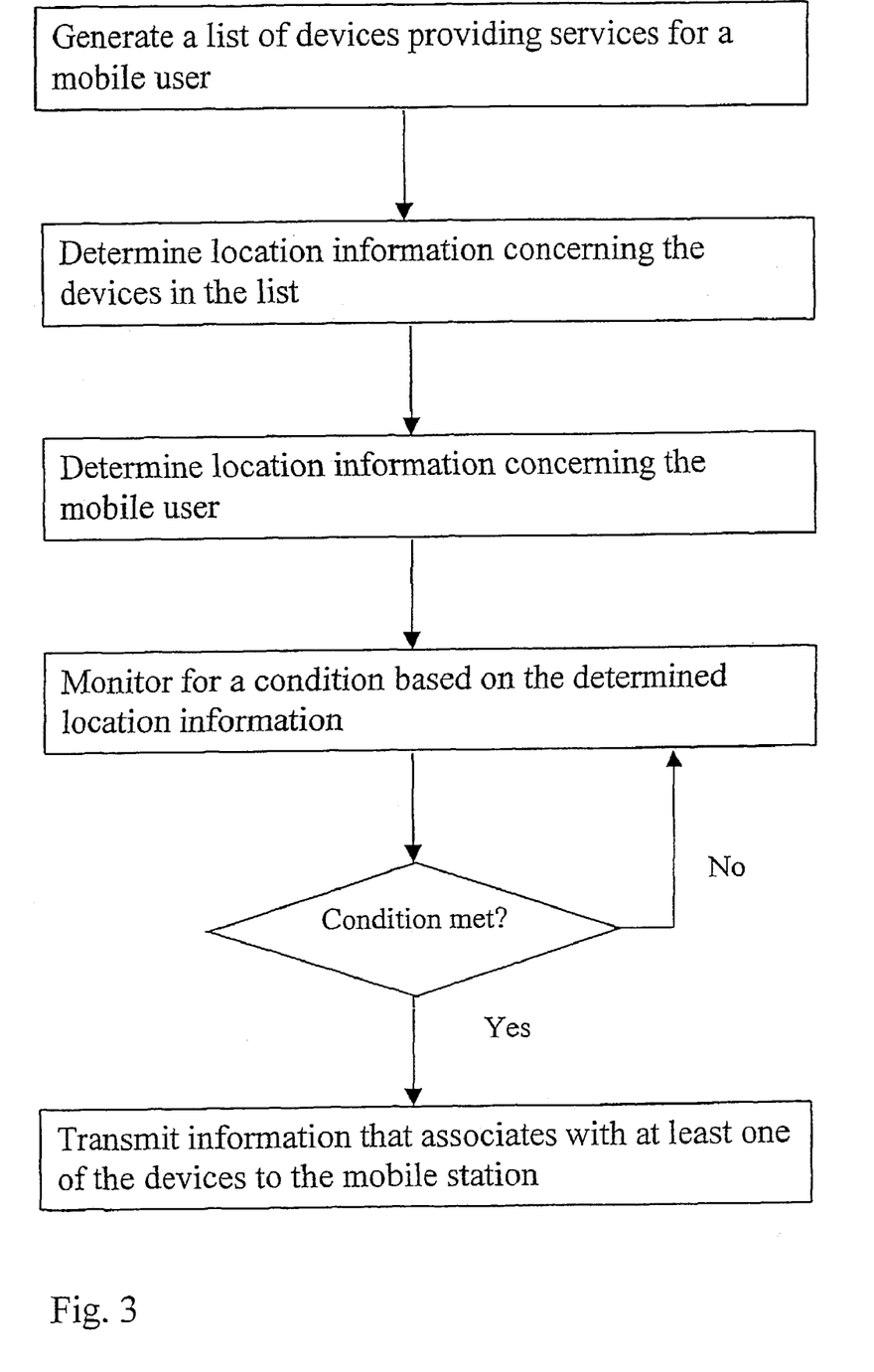
FIG. 3 is a flowchart illustrating the operation of one embodiment of the present invention.

FIG. 2 illustrates schematically a possible grouping where a mobile station 7 subscribing to a cellular system may use services provided by service provision entities A that will be referred to in the following as devices. The mobile station 7 is within a service provision area, that in FIG. 2 has a form of a circle 17 with a predefined diameter, such as, for example, 1 kilometre. The devices A are provided with radio modules 23 for communication via a wireless communication system. The communication system may be the same as for the mobile station 7 or different. The devices a may also communicate via a fixed line connection. Information concerning the location of the mobile station and/or devices A is provided into a location service node 12.

The LCS client or a processing entity 8 is provided with a Group A table 14 that lists devices A that belong to a group. The processing entity may contain more that one table, such as the other table 15 for Group B devices. Each of the groups may be divided into subgroups. Location information is transmitted from the LCS 12 to the processing entity 8 either on request or periodically within predefined intervals or in response to a predefined event (e.g. a location update).

In some embodiments it may also be advantageous to be able to adjust the frequency of the transportation of location information. For example, if a subscribing device wishes to approach another device (target device), the enquiry to the location service may be made more frequent. After a mobile station has been located, it may also be possible to request for a more accurate information concerning the location of the mobile station. The density of the enquiries may be increased/decreased dynamically based on the location(s) of the subscribing device and/or the target device(s).

The processing entity may comprise an IN service that is provided with predefined information of the listed devices A that subscribe to the IN service. The Intelligent Network (IN) service may keep track of the locations of the subscribers of the Group A list 14. When a predefined mobile station (or stations) is (are) close enough to at least one member of the list, the services may notify the mobile station 7 and/or one or several of the subscribers A. In FIG. 2 the condition is met by group A device 20 that is within the service area 17 of the mobile station 7.

Before discussing the operation of the embodiment employing an IN arrangement in more detail, a brief explanation of the term "intelligent network" will be given. The IN concept was developed in order to increase the flexibility and competitiveness of the telecommunication network architecture. The current IN solutions provide the telecommunication network operators with a possibility to implement new, powerful services in their networks in a fast and cost-effective manner. The basic principles and operation of the IN applications are well known, and therefore they are not described herein in more detail. It is sufficient to note that in general the IN architecture comprises a (service) switching point (SSP) for triggering a call to the IN services and a (service) control point (SCP) for providing the service. A more detailed description of the general IN concept can be found e.g. from the recommendations by the International Telecommunications Union (ITU-T), such as IN Capability Set CS-1 published in 1993. The IN concept can be implement in the fixed land line networks, such as the public switched telephone network (PSTN), or the wireless radio communication networks, such as the public land mobile network (PLMN).

The IN based embodiment may be implemented e.g. so that CAMEL SCP (CSE: CAMEL service environment) periodically asks the location of the subscribers belonging to the list from the GMLC. CAMEL is an abbreviation from 'customised applications for mobile network enhanced logic'. The CAMEL service environment (CSE) provides the execution environment within a CAMEL SCP executing a service logic. the SCP stands for 'service control point' of an Intelligent Network (IN).

The operation may be arranged such that whenever a subscriber of the service (i.e. the mobile station 7 in FIG. 2) is detected to be in a predefined location or distance relative to one or more of the members of the group (i.e. devices A of FIG. 2), appropriate information may be transmitted by means of the cellular system. The data may be sent in any suitable format. The transmission may contain voice, text or video data or any other data or any combination of these. The data may be sent transparently to the cellular system, e.g. by means of another protocol that is implemented on top of the cellular communication system. For example, the transmission between the service entity 8 and the mobile station and/or the devices A is based on wireless application protocol (WAP), or Transport Control Protocol (TCP), and/or Internet Protocol (IP) or IPV6 implemented on top of the cellular system. The packet switched cellular systems, such as the UMTS or the GRPS, also enable transportation of packet data to and from the wireless stations. The communication media for the location information service transportation between the mobile station and the service may also be based on other communication means than the communication system the mobile station subscribes to. For example, the mobile station may be provided with auxiliary data transportation means. The data may be transported, e.g. based on a short range radio links, such as a Bluetooth™ link, or infrared link or similar.

The subscription to the list in the service provider entity 8 may be based on a mutual agreement between the mobile user and the target device.

The service may be based on use of a predefined distance as condition that triggers the notification procedures. As shown by FIG. 2, it is also possible to define e.g. more than one distance radius the crossing of which causes a notification to be transmitted. The other distance is illustrated by the dashed line 18. The operation may then be e.g. such that a notification is transmitted on e.g. 2 km and 1 km distances or that different groups use different distances as the triggering event. The update frequency may be different within the inner circle 17 than what it is within the outer circle 18. In FIG. 2 device 20 is within the first radius, whereas device 21 is within the second distance and devices 23 are outside the larger service notification area defined by the circle 18.

A group of devices may be divided into a number of subgroups according to different subscriber categories. The division may be based on the role of the subscribing device A (e.g. salesman, manager, delivery car, serviceman, supervisor, inspector and so on). The subscribing devices A may also register dynamically the subscriber profiles or roles that they are interested in.

According to an embodiment the location information may be divided into several different accuracy classes. The service may request information in a predefined accuracy, depending the purpose it is going to use the information. For example, the service may initiate the information provision procedure by asking for only a rough location of the mobile station first. At this stage the accuracy of the location information may be in a network level or in a location area level. The rough location information may be requested e.g. from the home location register (HLR) of the particular mobile station or similar entity of the telecommunications system, i.e. without sending a request to the LCS 12. If the rough location is determined to be within a predefined area, then the service may request for a more accurate information from the LCS 12. A possible hierarchical order of the accuracy classes may be: 1) network level, 2) location area level, 3) cell level, and 4) geographical location from the location server.

Figure 4:
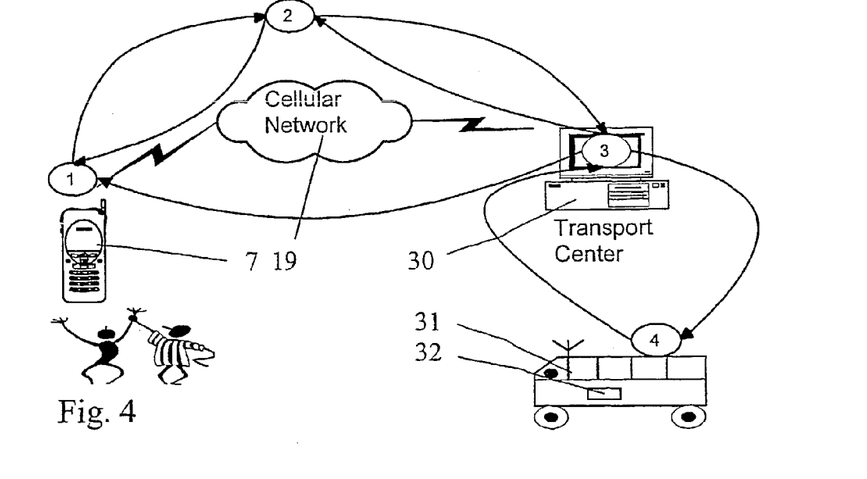
FIG. 4 illustrates an embodiment of the invention.
Figure 5:
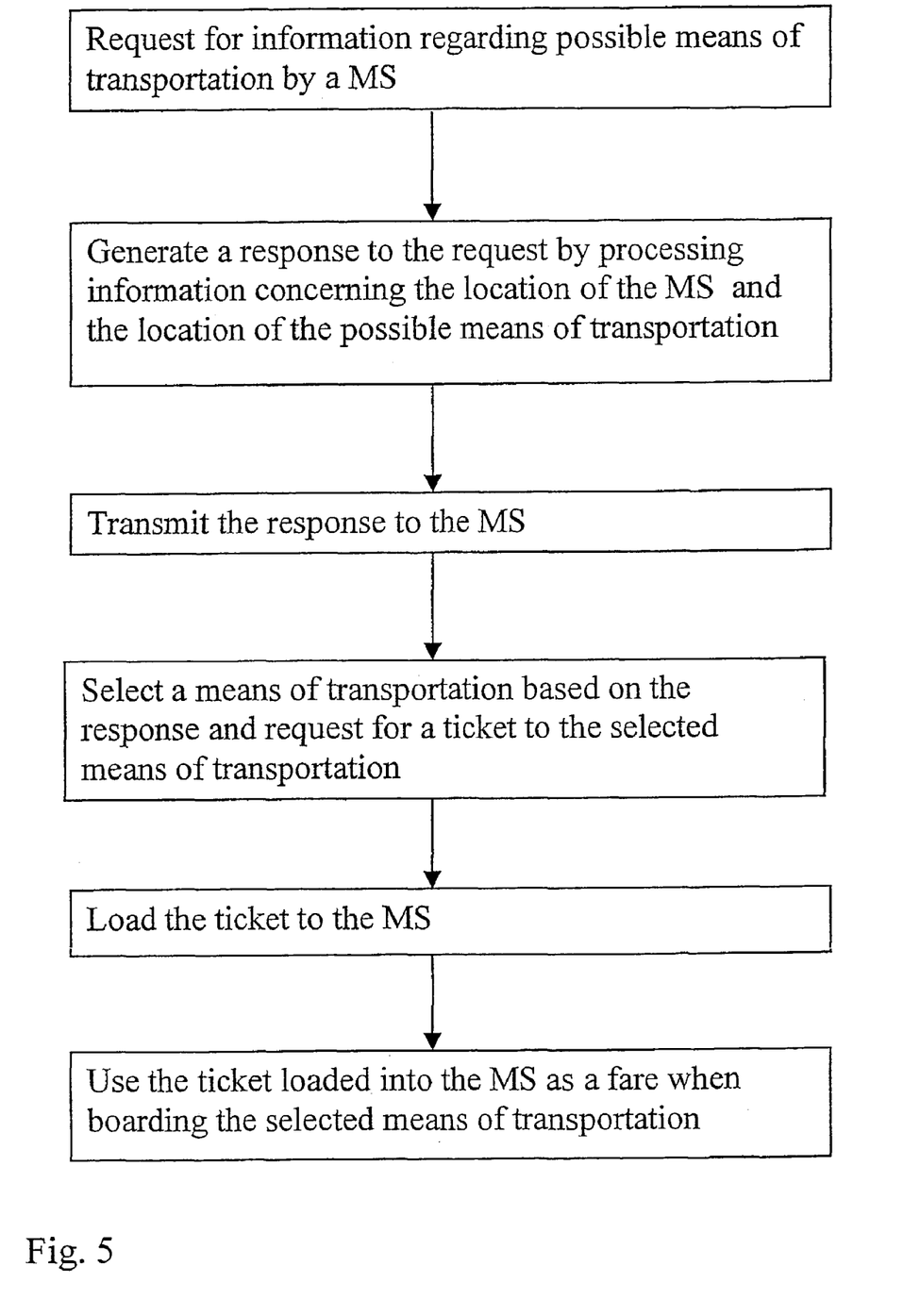
FIG. 5 is a flowchart illustrating the operation of an embodiment of the present invention.

The following will describe with reference to FIGS. 4 and 5 an embodiment wherein the location service features is utilised for proving information that relates to means of transportation that are available to mobile users. The embodiment may also be extended to reservation of seats in a selected means of transportation and/or issuance of transport tickets. The embodiments described below utilise the features of public land mobile network cellular systems for providing the information that associates with different public transportation systems and/or transport ticketing.

FIG. 4 illustrates an example of a cellular system based transport ticketing service. For the purpose of simplicity, the example will concentrate on the ticketing for busses, although the embodiment may be implemented in connection with any other means of transportation as well, such as trains, metros, taxis, mini-busses, flights, or any transport on demand services.

In the embodiment described below the condition to be met in order to trigger transmission of information to the user comprises a request by the user of the mobile station. In other words, the mobile user may ask first e.g. for the nearest bus coming to a bus stop by using his mobile handset. The mobile user may already have entered the bus stop or he/she may be in close vicinity thereof (e.g. within the service are 17 of FIG. 2). The request is transmitted via the PLMN network 19 to the transport center 30 for further processing.

The position of the mobile user and the bus 31 can be obtained either from the LoCation Services (LCS) 12 of the cellular system or any standalone positioning system, e.g. the GPS 16, as will be explained later. By accessing to the LCS, the transport center 30 or any other corresponding service provider center may receive updated information concerning the position of the bus 31 or several busses, depending the application. In other words, information of the location of the mobile user and the location of the bus is determined at this stage, and this information is processed at the transport center.

It may also be possible that location information and other predefined data may be sent automatically to the mobile user whenever a bus is localised and determined to be within a predefined distance from the mobile user. It is also possible to transport data of the mobile user requesting for the transport to the nearest bus or other possible transport means. The data may be transported by using, for example, short range radio link technology (e.g. the Bluetooth™) or any other inter-node communication means and a reference based positioning approach.

An appropriate message is generated to be transmitted to the mobile station. The message is based on processing the location information of the mobile user and at least one bus or any other means of transportation. The message may include information about the nearest bus, such as the bus number, the arrival time, destination, route, and the nearest bus stop and so on. The message may be sent to the user's mobile station from the transport center through the cellular network or any other communication system providing wireless media for the mobile users thereof. This may be provided e.g. by using IP interface based applications like the WAP (wireless application protocol) or by a circuit switched or packet switched communication media such as any IP network or a local short range radio link. The message may alternatively be generated in the means of transportation and sent therefrom to the user's mobile station via an appropriate communication media.

The mobile user may utilise the received information in various manners. The user may use the response as a base for a travel plan (e.g. to answer questions such as 'which means of transportation should I use?', 'at which time should I leave to the bus stop?', 'which bus stop should I use?' and so on).

According to a further embodiment described below, the transport ticketing procedure is supported by the PLMN communication system 19 in its entirety. In other words, the bus can be selected, the tickets can be reserved, paid and delivered to the user by means of the communication system. In accordance with the embodiment, if the information in the message to the mobile station meets the requirements set forth by the mobile user, the user may wish to use the mobile station for e.g. reserving a seat in the bus 31 or for paying the fare for the journey. The user may, for example, send a request for a bus ticket to the transport center by the mobile handset. The mobile user may be charged for the ticket e.g. in his/hers next telephone bill or he/she may pay e.g. by means of a WAP banking services, Internet banking services, SMS (short message service) banking services or any other means of electronic payment. The transport center 30 may then accept the ticket reservation and/or payment and send information for the mobile user so that the ticket is confirmed and/or that the mobile station is provided with necessary information so that the user may board the bus. This information may include, for example, time of reservation, validity of the ticket, departure stop, destination, date, bus number, and so on. It may also be possible to cancel the ticket if the mobile user wishes to do so.

The service provider may also provide a 'follow me' type service for the mobile user for guiding the user to the nearest (or otherwise appropriate) bus stop or other location where he may board a transportation means. For example, a regional map may be shown in the display of the mobile device. Relevant guidance data (such as street names and possible landmarks) may be marked on the map to be followed by the user. The follow me services can also be employed e.g. by a taxi or other transport on demand type means of transportation to find the mobile user who requested for the transportation service.

At the same time as transmitting the information to the wireless mobile station 7, the transport center 30 may send the same information or a predefined set of information to a ticketing machine 32 of the bus 31. In case the user may a bus of a plurality of possible busses, the information may be sent to the ticketing machines of all possible busses. The transmission to the ticketing machine 32 may be accomplished by means of the same cellular network as to the mobile station, or via another network. The ticketing machine associates with an appropriate radio receiver apparatus for enabling the receipt of the information and/or transmission towards the transport centre 30.

An appropriate communication media may be provided for local communication between the mobile station 7 and the ticketing device 32. The communication media may be based, for example, on an infrared link or a short range radio link, such as the Bluetooth™. When passenger boards the mobile station may communicate with the ticketing machine, whereby an integrity check of the reserved ticket information is provided. The ticketing-machine 32 may send the results of the checking process to the transport center 30. This may include all the relevant ticket information. The ticket's information may be saved to the memory of the mobile handset until the ticket is valid so that it can be checked e.g. by an inspector terminal or human inspector if necessary.

The ticketing machine may send a report to the transport center concerning the boarding and/or getting of the mobile user. If the mobile user has not been charged when he/she purchased the ticket, the invoicing may be based on the report. The invoicing may occur directly or by telephone invoicing using the billing services provided by the operator of the telecommunications system or by a service provider who provides the location services.

The arrangement may be adapted to renew the ticket, e.g. after passenger has arrived to the final destination or the ticket validity time has been expired.

It is also possible to provide a ticket for the desired means of transportation for the user without a requirement for the user to access the telecommunications network 19. That is, a journey specific communication with the transport centre or a ticket machine in the means of transportation or e.g. in a bus stop or train platform. In this embodiment the ticket information may be downloaded to the mobile station in advance by communicating with the transport center. The ticket may be reserved/paid for a specific period (e.g. series of tickets, a monthly travel pass). The reservation/payment request may include information that is required for any form the purchasing of a periodical travel pass. The pass may comprise e.g. a proximity card or a similar card. As the passenger is boarding the transportation means, the passenger communicates with the ticketing machine to download the needed ticket information thereto. The information of the used ticket may be saved until the end of the validity period thereof. Every time the passenger uses one ticket the number of downloaded tickets in the mobile station will be decreased by one. This can also be done by the transport center if desired.

According to an embodiment the ticket machine is provided with location information processing facility, i.e. is capable of providing a location service function and providing the location information required by the service.

Figure 6:
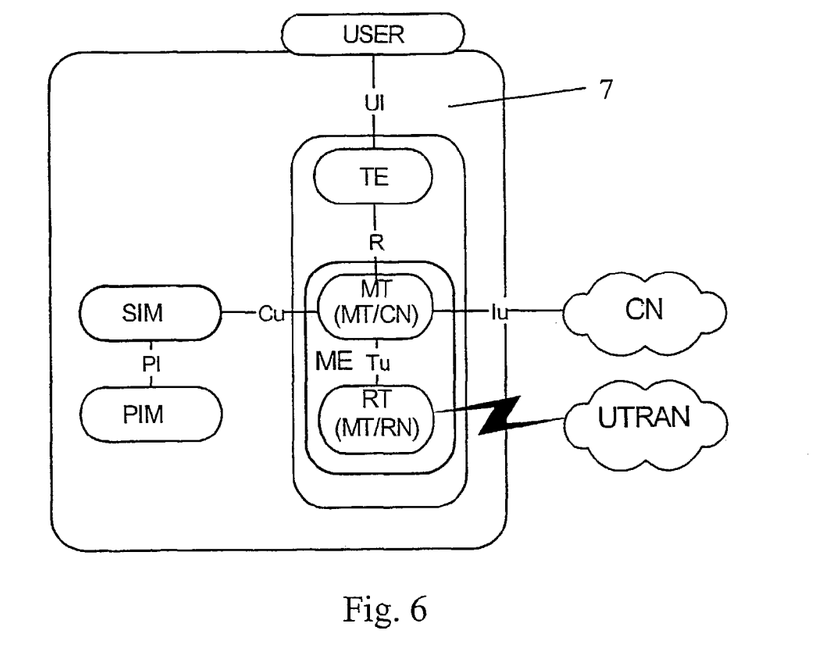
FIG. 6 shows a user equipment in accordance with a further embodiment.

A still further embodiment will be described with reference to FIG. 6. The payment for the ticket may be accomplished by utilising a Personal Identification Module (PIM) that is integrated into the mobile device 7. The reliability and security are important features of a personal identification card/data solutions. The embodiment described with reference to FIGS. 6 and 7 enables the user to use the identification card/data whenever he/she needs it and may ensure that the signalling over the PLMN network is secure enough for transferring identification data.

The first pre-condition principle is behind the proposal architecture. FIG. 6 illustrates an architecture including a personal identification card that is integrated within a mobile handset i.e. the User Equipment (UE). As is shown in FIG. 6, in addition to Subscriber Identity Module (SIM), the user equipment comprises an independent Personal Identity Model (PIM), which is specified exclusively for the personal usage by the mobile user when the user intents to request services from municipalities or any other authorities. The proposed PIM may also be logically separated, but physically integrated into a SIM card and vice versa.

The PIM may include several different capabilities. For example, the PIM may have variable Personal Identity Code (PIC). That is, whenever the user is going to access to the municipality services he/she has to log on by using the user specific PIC. The PIM may also have a higher priority than the SIM. That is, the PIC of the PIM may be adapted to have priority over the PIN of the SIM, meaning that if mobile user logs on by using the PIC he/she is already authorised to use both the SIM and PIM access. If he/she logs on by using the PIN code then he/she may only be authorised to have access for the SIM, that is, for only communication purposes and not for any municipality or other services.

The PIM may also be defined to contain so called 'least storage data', i.e. the PIM may include a minimum amount of personal data like the name of holder, his/hers birthday, identity number, nationality, and so on. The least storage data may originally be fixed to the PIM. In addition to the least storage data, the PIM may include 'variable storage data' feature. In other words, it may be possible to download the needed data from the network/service provider to the PIM. Such applications may include, for instance, downloading money, transport tickets, a permission like visa or work permission, prescriptions, user specific health services, and so on. It should also be possible to remove this sort of data on-line by an authority who is entitled to do so.

The PIM may also comprise a capability of keeping record od the operations performed by the user. The PIM may be capable of saving a specific amount of previous operations or operation of predefined type. The data history may also include the position of the UE where the PIM has been accessed, e.g. the position where a transport ticket has been paid. This functionality will be some kind of X-file for PIM. The X-file can be defined as a component of the PIM that is used for storing the history data. For example, when the mobile user pays for the journey or makes any other payments by means of the mobile station, the position,, date and time, amount and purpose of payments and so on may be stored on said X-file.

The PIM may also be removable from the user equipment. It shall be possible to physically remove the PIM easily without disturbing the SIM. This may be used to ensure that even when no connection is provided for the mobile station (MS) or when the MS is switched off the user may still have an identification card/data which can be read by the appropriate authority by using a reading device. Therefore, when there is no connection via the PLMN network to the authority the user may access the server directly by using his/her PIC. If he/she has an access to the communication network she/he is still allowed to access the municipality network by using PIC on fly. This means that it is possible to use the PIM-module in a stand-alone manner. For example, when a user arrives an airport, he/she may have an electronic passport in the PIM. However, the user may not have a connection the PLMN network at the time of arrival. The user may take the PIM out from the mobile station and use the information stored therein.

If there is no network connection but an infrared link or a short range radio link is available, then the user may use the link and log on using his/her PIC.

Figure 7:
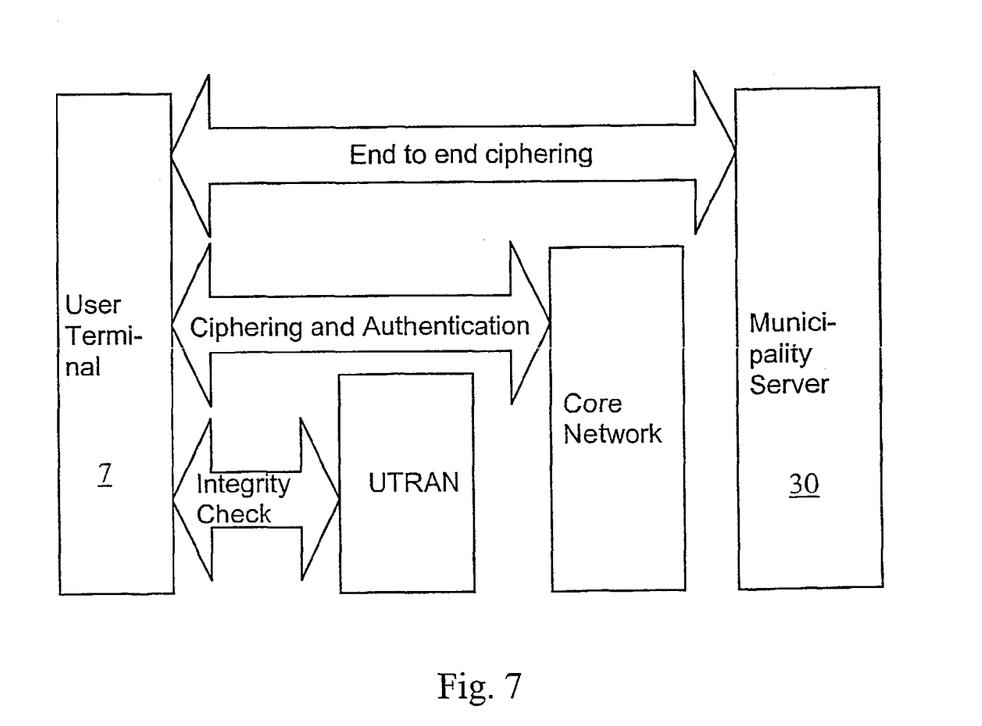
FIG. 7 illustrates a possible ciphering hierarchy for the FIG. 6 embodiment.

FIG. 7 illustrates a possible ciphering hierarchy of the PIM embodiment. The PIM solution may be supported by various level of ciphering that is already available within the cellular network systems. These include signalling ciphering, that is, integrity checking, user data ciphering, and the PIM specific ciphering.

The principles of the above mobile Personal Identification Module (PIM) may be implemented in the context of any location based services. The applications may include, for example, downloading money, transport tickets, a permission like visa or work permission, any other municipality services, mobile lottery in which the mobile user requests a specific series of lottery either manually or randomly by using an advanced algorithm, and so on. The user may chose the specific numbers either manually or by using a feature supported by mobile device.

As it was mentioned earlier, the mobile transport ticketing may be applied for any form of transporting i.e. bus, taxi, train, etc. taking into account the specific characteristics of the different means of transportation.

As was also briefly mentioned above, it shall be possible for the location determining process to make use of other sources of information in determining the location of the mobile station and the other entity than the information provided by the LCS node 8. The geographical location may be obtained from an external source, e.g. from the well known satellite based GPS (Global Positioning System). More accurate location information can be obtained through a differential GPS. In addition to the GPS, any other similar system capable of providing reliable location information can be used for these purposes. Some mobile stations may also have additional (independent) sources of position information of the type discussed earlier. The accuracy of the location determination may be improved by utilising results of different location measurement and/or determination techniques.

It should be appreciated that although the above refers to wireless interfaces between the various devices and the communication system, the devices of the group and/or the stations may transmit and/or receive information signals via a fixed connection. For example, one or more of the stations may be temporarily connected to a communication system via a cable for data transmission purposes.

The embodiments of the present invention, when applied to the means of transportation, enable the mobile user to receive information of the possible means of transportation into his/hers mobile terminal. The user may not need to input any specific information concerning his positions. The embodiments may also enable a ticketless operation of the transport system. In addition, the embodiments may be used in transport on demand type services, since the transport centre may provide accurate information for service provider for use in route planning. The user may be billed in the their telephone bill, or the users may use any form of electronic payment. The electronic payment may be activated by the mobile station. The embodiments may utilise mobile value-added services such as the LCS and the IN services. The embodiments may increase the usability of the mobile station. The embodiments may also facilitate fleet management in an efficient way by utilising the features of a cellular positioning system.

It should be appreciated that whilst embodiments of the present invention have been described in relation to mobile stations, embodiments of the present invention are applicable to any other suitable type of user equipment.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
providing a service based on location information for a user of a communication system;
grouping a plurality of mobile devices being configured to provide the service for the user into a group, wherein each mobile device comprises a means of transportation;
determining first location information that associates with the geographical location of at least one of the means of transportation;
determining second location information that associates with the geographical location of a mobile station;
processing at a processing entity the first and second location information to generate third information that associates with at least one means of transportation that is available for the user based on the location of the mobile station relative to the location of the at least one means of transportation;
transporting the third information from the processing entity to the user, the transportation being triggered by a predefined event; and
presenting a plurality of possible means of transportation to the user by the mobile station, wherein the user is enabled to select a means of transportation from among the presented possibilities.

2. The method according to claim 1, further comprising:
transmitting the third information from the processing entity to the user in a data message.

3. The method as claimed in claim 1, further comprising:
triggering the transmission when the mobile station and the at least one means of transportation are located in a predefined manner relative to each other.

4. The method as claimed in claim 1, further comprising:
triggering the transmission when the mobile station and the least one means of transportation are determined to be within a predefined distance from each other.

5. The method as claimed in claim 1, further comprising:
configuring the devices constituting a group to be dynamically changeable.

6. The method as claimed in claim 1, further comprising:
keeping track, by the processor entity, of the locations of the devices of the group.

7. The method as claimed in claim 6, further comprising:
transporting the first location information and/or second location information from a location information node to the processor entity.

8. The method as claimed in claim 7, further comprising:
transporting the first and/or second location information periodically in fetching periods from the location information node to the processor entity.

9. The method as claimed in claim 8, further comprising:
changing the length of the fetching period.

10. The method as claimed in claim 7, further comprising:
signaling a request to the location information node for fetching the location information to the processor entity.

11. The method as claimed in claim 1, further comprising:
configuring the mobile station to transmit and/or receive information signals via a wireless interface.

12. The method as claimed in claim 1, further comprising:
transmitting the third information to the mobile station via a cellular communication network.

13. The method as claimed in claim 1, further comprising:
configuring the devices of the group to transmit and/or receive information signals via a wireless interface.

14. The method as claimed in claim 1, further comprising:
configuring the devices of the group and/or the mobile station to transmit and/or receive information signals via a fixed connection.

15. The method as claimed in claim 1, further comprising:
monitoring at least one condition for generating the event that triggers the transporting the third information.

16. The method as claimed in claim 15, wherein the monitoring at least one condition comprises monitoring a first condition of a first distance between the mobile station and the at least one device and a monitoring a second condition of a second distance between the mobile station and the at least one device.

17. The method as claimed in claim 1, further comprising:
dividing the group further into two or more subgroups.

18. The method as claimed in claim 1, further comprising:
transporting information to at least one other device of the group after the event has triggered the transporting the third information.

19. The method as claimed in claim 1, further comprising:
grouping the devices in one or more lists.

20. The method as claimed in claim 1, further comprising:
grouping the devices in a table.

21. The method as claimed in claim 1, further comprising:
determining the first location information and/or the second location information based on information produced by at least one location determination element of the communication system.

22. The method as claimed in claim 1, further comprising:
transmitting information based on a protocol that is transparent for the communication system to which the mobile station subscribes.

23. The method as claimed in claim 1, further comprising:
transmitting information based on one protocol of: a wireless application protocol; a transport control protocol; or an internet protocol.

24. The method as claimed in claim 1, further comprising:
determining the first location information and/or the second location information based on data produced by a location determination system that associates with the communication system to which the mobile station subscribes.

25. The method as claimed in claim 1, further comprising:
determining the first location information and/or the second location information based on data produced by a location determination system that is external to the communication system to which the mobile station subscribes.

26. The method as claimed in claim 1, further comprising:
grouping the devices into more than one group.

27. The method as claimed in claim 1, further comprising:
permitting the user of the mobile station to register to one or more groups of devices based on personal interests of the user of the mobile station.

28. The method as claimed in claim 1, further comprising:
using a personal identification module that associates with the mobile station for authorizing the user of the mobile station to access a service provided by means of at least one of the devices.

29. The method as claimed in claim 1, further comprising:
managing, by an intelligent network service, the information of the grouping of the devices, the first location information, and the second location information;
keeping track, by the intelligent network service, of the locations of the devices of the group; and
monitoring, by the intelligent network service, for the predefined event.

30. The method as claimed in claim 1, further comprising:
initiating, by the user, the information provision process by inputting a request for the third information to the mobile station.

31. The method as claimed in claim 1, further comprising:
signaling a request for reservation from the mobile station to a transport center.

32. The method as claimed in claim 31, further comprising:
confirming the request for reservation by a message that is transported from the transport center to the mobile station.

33. The method as claimed in claim 1, further comprising:
presenting the third information to the user, wherein the presenting the third information comprises presenting at least one of: information of the possible means of transportation at the location of the mobile station; information of the timetables for the possible means of transportation; information of the expected waiting times; information of the fares of the possible means of transportation; information of the availability of seats in the possible means of transportation; or information of the possible means of payment.

34. The method as claimed in claim 1, further comprising:
after the user has selected a means of transportation, paying the fare for a journey by said means of transportation using payment instructions signaled from the mobile station.

35. The method as claimed in claim 34, further comprising:
accomplishing the payment based on an electronic payment procedure.

36. The method as claimed in claim 34, further comprising:
accomplishing the payment using a personal identification module that associates with the mobile station.

37. The method as claimed in claim 1, further comprising:
verifying a status of the request for reservation of the available means of transportation during the processing of the first and second information to obtain the third information.

38. The method as claimed in claim 37, further comprising:
omitting means of transportation with no seats available from the third information.

39. The method as claimed in claim 1, further comprising:
signaling information of a payment for a journey to the mobile station; and
permitting the user to board the means of transportation based on the information received at the mobile station.

40. The method as claimed in claim 39, further comprising:
communicating, by the mobile station, with a ticketing device during the boarding via a temporary interface between the mobile station and the ticketing device.

41. The method as claimed in claim 40, wherein the communicating via the temporary interface comprises communicating via at least one of an infrared link or a short range radio link.

42. The method as claimed in claim 40, further comprising:
transmitting information of a reservation made by the mobile station to the ticketing device of the selected means of transportation.

43. The method as claimed in claim 40, further comprising:
providing, by the ticketing device, an integrity check of the reservation.

44. The method as claimed in claim 40, further comprising:
sending, by the ticketing device, information concerning the boarding of the user to a transport center.

45. The method as claimed in claim 1, further comprising:
storing information of the selected means of transportation in the mobile station.

46. The method as claimed in claim 1, further comprising:
basing the route of the selected means of transportation on the selection by the user.

47. A system, comprising:
a mobile station of a communication system;
a plurality of mobile devices configured to provide at least one service for a user of the mobile station, each mobile device comprising a means of transportation;
means for grouping the plurality of devices into at least one group;
means for determining first location information, the first information associating with the geographical location of at least one of the means of transportation;
means for determining second location information, the second information associating with the geographical location of the mobile station;
processor means for processing the first location information and second location information for generating third information, associated with means of transportation available for the user based on relative locations of the mobile station and the at least one device; and
interface means for transmitting the third information to the mobile station after the transmission is triggered by a predefined event;
presentation means in the mobile station for presenting a plurality of possible means of transportation to the user; and
selection means in the mobile station for enabling the user to select a means of transportation from among the presented possibilities.

48. The system as claimed in claim 47, further comprising:
means for triggering the transmission when the mobile station and the at least one device are located in a predefined manner relative to each other.

49. The system as claimed in claim 47, wherein the processor means is configured to keep track of the locations of the devices of the group.

50. The system as claimed in claim 47, wherein the mobile station is configured to transmit and/or receive information signals via a wireless interface.

51. The system as claimed in claim 47, wherein the first location information and/or the second location information is configured to be determined based on data produced by a location determination system that associates with the communication system to which the mobile station subscribes.

52. The system as claimed in claim 47, wherein the first location information and/or the second location information is configured to be determined based on data produced by a location determination system that is external to the communication system to which the mobile station subscribes.

* * * * *